(12) United States Patent
Huenink et al.

(10) Patent No.: US 11,554,689 B2
(45) Date of Patent: Jan. 17, 2023

(54) SEATING ARRANGEMENT

(71) Applicant: DEERE & COMPANY, Moline, IL (US)

(72) Inventors: Brian M. Huenink, Cedar Grove, WI (US); Gregory O. Mcconoughey, Le Claire, IA (US); Jonathan E. Drum, Raleigh, NC (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 17/307,333

(22) Filed: May 4, 2021

(65) Prior Publication Data
US 2022/0063449 A1 Mar. 3, 2022

Related U.S. Application Data

(60) Provisional application No. 63/072,818, filed on Aug. 31, 2020.

(51) Int. Cl.
*B60N 2/02* (2006.01)
*A47C 1/023* (2006.01)

(52) U.S. Cl.
CPC ............ *B60N 2/0284* (2013.01); *A47C 1/023* (2013.01); *B60N 2/0224* (2013.01)

(58) Field of Classification Search
CPC ...... B60N 2/0284; B60N 2/0224; A47C 1/023
See application file for complete search history.

(56) References Cited

U.S. PATENT DOCUMENTS

| | | | |
|---|---|---|---|
| 4,463,426 A | 7/1984 | Caddick et al. | |
| 4,689,537 A | 8/1987 | Mizuta et al. | |
| 7,597,398 B2 | 10/2009 | Lindsay | |
| 7,669,928 B2 | 3/2010 | Snyder | |
| 7,681,949 B2 | 3/2010 | Nathan et al. | |
| 7,684,949 B2 | 3/2010 | Koerner | |

(Continued)

FOREIGN PATENT DOCUMENTS

| | | |
|---|---|---|
| DE | 19919216 C2 | 10/2001 |
| DE | 102004016315 A1 | 10/2005 |

(Continued)

OTHER PUBLICATIONS

German Search Report issued in application No. 102021208282.3, dated Jul. 11, 2022, 10 pages.

*Primary Examiner* — Syed A Islam
(74) *Attorney, Agent, or Firm* — Michael Best & Friedrich LLP

(57) ABSTRACT

A seating arrangement includes a base, a seat mounted to the base, the seat having a width extending from a first side to a second side and a length extending in a forward direction from a rear side to a front side. The seating arrangement further includes a backrest positioned adjacent the rear side of the seat. The seating arrangement further includes a cushion length adjustment (CLA) coupled to the seat at the front side. The CLA has a width bisected by a centerline. A first side of the CLA is at least partially defined by a first curved surface extending downward in the forward direction and extending downward toward the base away from the centerline. A second side of the CLA is at least partially defined by a second curved surface extending downward in the forward direction and extending downward toward the base away from the centerline.

20 Claims, 4 Drawing Sheets

(56) References Cited

U.S. PATENT DOCUMENTS

| | | |
|---|---|---|
| 7,708,343 B2 | 5/2010 | Kayumi et al. |
| 7,819,474 B2 | 10/2010 | Gloriosa |
| 9,321,373 B2 | 4/2016 | Sakata et al. |
| 9,848,814 B2 | 12/2017 | Benson et al. |
| 10,773,624 B2 * | 9/2020 | Morrow ................ B60N 2/686 |
| 2017/0147958 A1 | 5/2017 | Hatfield et al. |
| 2017/0297581 A1 | 10/2017 | Hatfield et al. |

FOREIGN PATENT DOCUMENTS

| | | |
|---|---|---|
| DE | 102008004121 A1 | 7/2009 |
| DE | 102013211721 A1 | 12/2013 |
| DE | 102015219461 A1 | 4/2017 |
| DE | 102018007365 A1 | 1/2019 |
| KR | 1019970036515 A | 7/1997 |

* cited by examiner

SEATING ARRANGEMENT

CROSS REFERENCE TO RELATED APPLICATIONS

This application claims priority to U.S. Provisional Patent App. No. 63/072,818, filed Aug. 31, 2020, the entire contents of which are herein incorporated by reference.

BACKGROUND

The present disclosure relates to vehicle seats and more particularly relates to seats for agricultural equipment such as cotton harvesters and combine harvesters.

Agricultural equipment includes powered machinery capable of transporting, cultivating, planting, fertilizing, irrigating, sorting, harvesting, and other operations in the agriculture industry. Some equipment is driven (e.g., towed) by field vehicles such as tractors, for example planters and seeders. Other agricultural equipment includes a motor, transmission, and operator cabin such that the equipment is self-driven or self-propelled (i.e., does not require a tractor for towing), for example cotton harvesters and combine harvesters.

Features and parameters of the disclosure will become apparent by consideration of the following detailed description and accompanying drawings.

SUMMARY

In one embodiment, a seating arrangement includes a base and a seat mounted to the base, the seat having a width extending from a first side to a second side and a length extending in a forward direction from a rear side to a front side, the seat configured to support a user seated thereupon. The seating arrangement further includes a backrest positioned adjacent the rear side of the seat and configured to support a back of the user. The seating arrangement further includes a cushion length adjustment (CLA) coupled to the seat at the front side. The CLA has a width bisected by a centerline, such that a first side of the CLA is adjacent the first side of the seat and a second side of the CLA is adjacent the second side of the seat. The first side of the CLA is at least partially defined by a first curved surface extending downward in the forward direction and extending downward toward the base away from the centerline. The second side of the CLA is at least partially defined by a second curved surface extending downward in the forward direction and extending downward toward the base away from the centerline.

In some embodiments, the cushion length adjustment is mirrored about the centerline.

In some embodiments, the CLA extends forward of the front side of the seat in the forward direction.

In some embodiments, the CLA has a width parallel to the width of the seat, wherein the width of the CLA extends at least 80% of the width of the seat.

In some embodiments, the CLA has a width parallel to the width of the seat, wherein the width of the CLA extends at least 90% of the width of the seat.

In some embodiments, the CLA has a width parallel to the width of the seat, wherein the width of the CLA extends at least 100% of the width of the seat.

In some embodiments, the first curved surface of the CLA is aligned with the first side of the seat to define a smooth interface between the first curved surface and the first side of the seat.

In some embodiments, the second curved surface of the CLA is aligned with the second side of the seat to define a smooth interface between the second curved surface and the second side of the seat.

In some embodiments, the CLA includes a central portion, a first wing coupled to a first side of the central portion, and a second wing coupled to a second side of the central portion, wherein the first wing defines the first curved surface and the second wing defines the second curved surface.

In some embodiments, the central portion, the first wing, and the second wing collectively define a width of the CLA.

In some embodiments, the central portion includes two horizontal portions connected by a vertical portion, and wherein the CLA further comprises a compressible material located adjacent the vertical portion.

In some embodiments, the CLA further comprises a compressible material positioned over each of the first wing and the second wing.

In some embodiments, the CLA further comprises a compressible material positioned over the first curved surface and the second curved surface.

In some embodiments, the CLA is located directly adjacent to the front side of the seat.

In some embodiments, the first curved surface is defined by a first arcuate profile extending in a widthwise direction perpendicular to the forward direction adjacent the front side of the seat, a second arcuate profile sloping downward in the forward direction, and a third arcuate profile that connects the first and second arcuate profiles.

In some embodiments, the second curved surface mirrors the first curved surface.

In some embodiments, the position of the CLA is adjustable relative to the seat.

In some embodiments, the position of the CLA is adjustable relative to the base.

In some embodiments, the seat is an automotive seat positionable in a vehicle for use by an operator of the vehicle.

In some embodiments, the CLA is removable from the seat and the base.

In another embodiment, a seating arrangement includes a base and a seat mounted to the base, the seat having a width extending from a first side to a second side and a length extending in a forward direction from a rear side to a front side, the seat configured to support a user seated thereupon. The seating arrangement further includes a backrest positioned adjacent the rear side of the seat and configured to support a back of the user. The seating arrangement further includes a cushion length adjustment (CLA) coupled to the seat at the front side. The CLA has a width bisected by a centerline, such that a first side of the CLA is adjacent the first side of the seat and a second side of the CLA is adjacent the second side of the seat. The first side of the CLA is aligned with the first side of the seat to define a smooth interface between the first side of the CLA and the first side of the seat. The second side of the CLA is aligned with the second side of the seat to define a smooth interface between the second side of the CLA and the second side of the seat.

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways. Also, it is to be understood that the phraseology and terminology used herein is for the purpose of description and should not be regarded as limiting.

DETAILED DESCRIPTION

Figure 1:
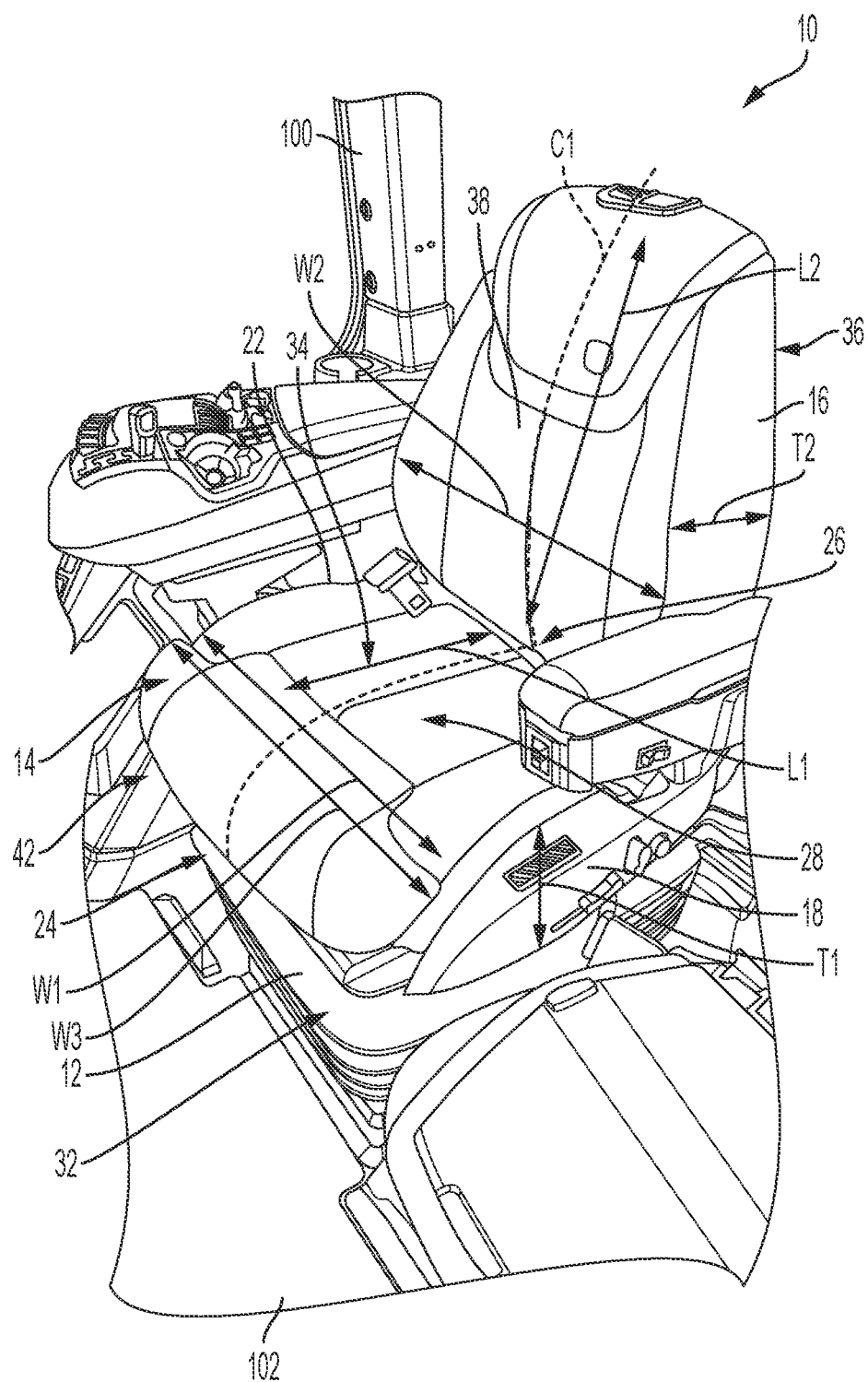
FIG. 1 is a perspective view of a seating apparatus having a first cushion length adjust (CLA).

As shown in FIG. 1, a seating arrangement 10 for a vehicle 100 such as an agricultural vehicle (e.g., cotton harvester, combine harvester) includes a base 12, a seat 14, and a backrest 16. The base 12 is mounted to the body (e.g., floor 102) of the vehicle 100 via fasteners (not shown) such that the seating arrangement 10 is fixed to the remainder of the vehicle 100. The base 12 is located between the floor 102 and the seat 14, thereby placing the seat 14 at a height above the floor 102. The seat 14 is a seating surface upon which a user or operator of the vehicle 10 sits when operating the vehicle 100. The backrest 16 provides a surface for supporting a back of the operator. The seating arrangement 10 is bisected by a centerline C1 such that the seat is generally mirrored about the centerline C1. In some embodiments, controls or internal components may not be uniformly mirrored about the centerline C1.

Figure 2:
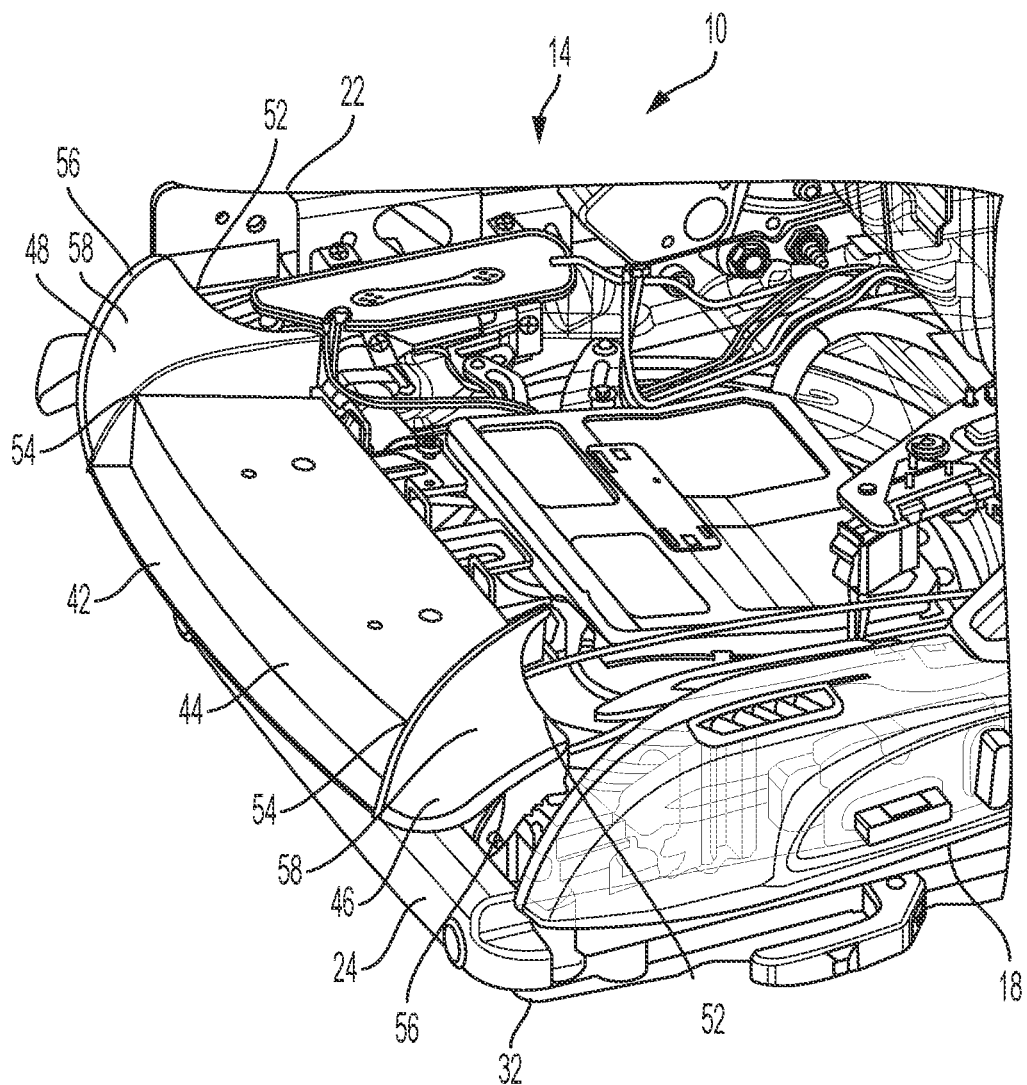
FIG. 2 is a partial perspective view of a seat of a seating apparatus having a second CLA.
Figure 3:
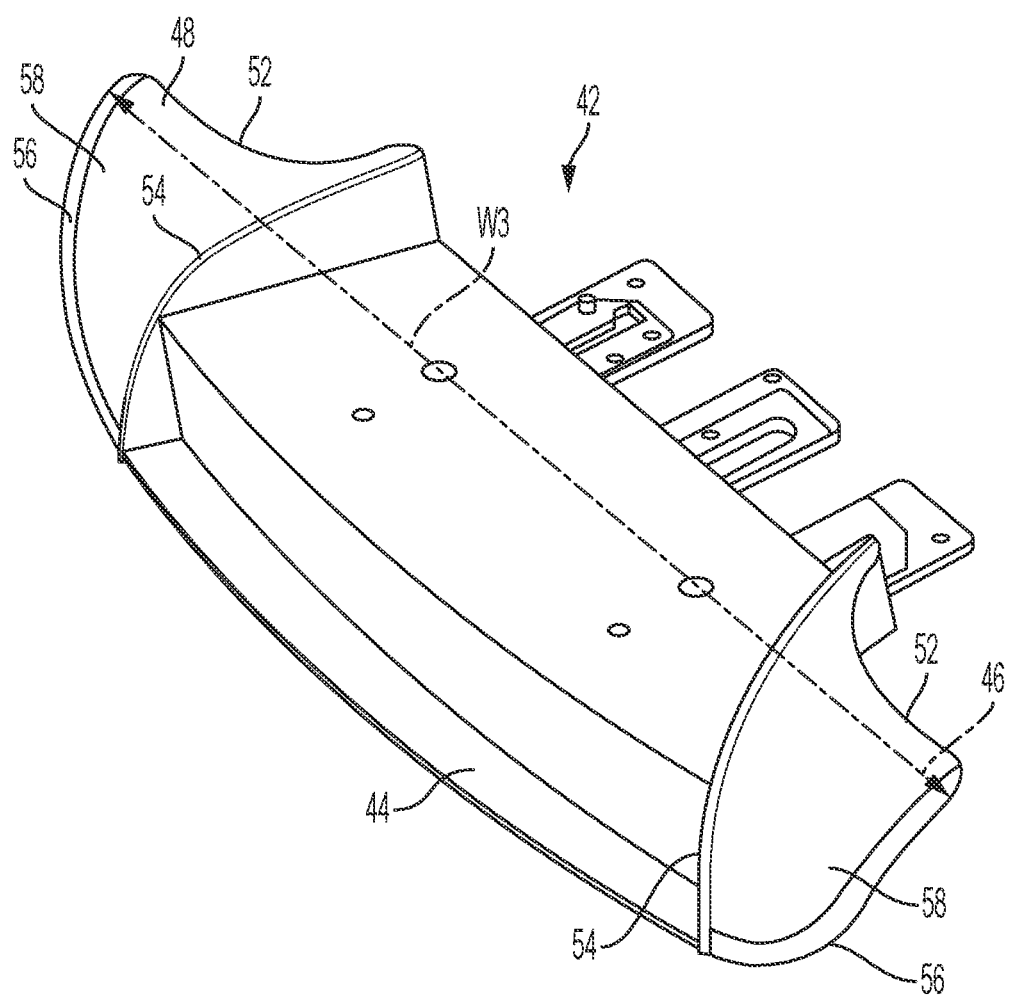
FIG. 3 is a perspective view of the second CLA.
Figure 4:
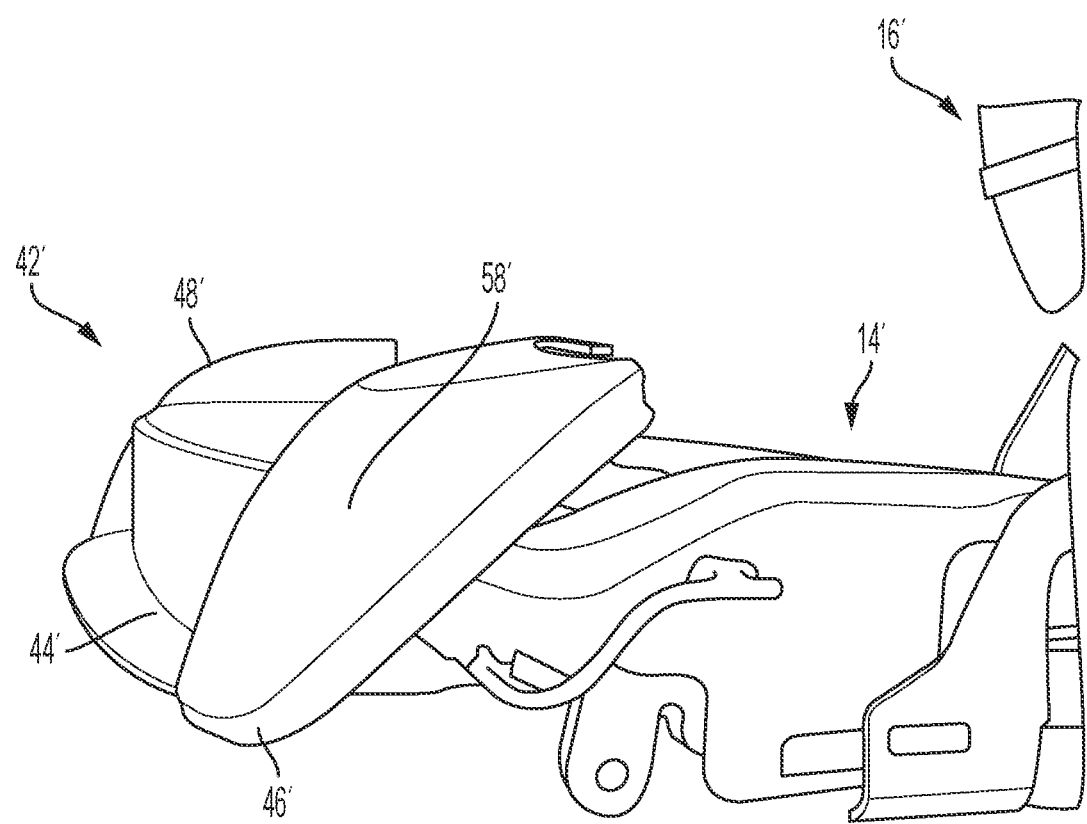
FIG. 4 is a perspective view of the first CLA.

The seat 14 and backrest 16 may be made of a number of different materials and both generally include a rigid structure or frame (e.g., metal, rigid plastic, etc.) that provides the general shape and support for the seating arrangement, a compressible material such as a foam placed on the frame for cushion, comfort, and ergonomics, and a cover (e.g., nylon, leather, etc.) that holds the compressible material relative to the frame. FIG. 1 illustrates seating arrangement 10 with a frame, compressible material, and cover fully assembled. FIGS. 2-4 illustrate only frames.

With continued reference to FIG. 1, the seat 14 includes a width W1, length L1, and thickness T1. The width W1 of the seat 14 extends between a left side 18 and a right side 22. The length L1 of the seat 14 extends between a front side 24 and a rear side 26. Collectively, the width W1 and length L1 (in combination with the cushion length adjust 42 described in greater detail below) define a horizontal seating surface 28 of the seat 14 upon which the user sits when operating the vehicle 100. The width W1 of the seat 14 is generally uniform, though may vary slightly along the length L1 of the seat and is measured adjacent the front side 24 of the seat 14. The thickness T1 of the seat 14 extends between a lower side 32 adjacent the base 12 and an upper side 34 that defines the seating surface 28.

The backrest 16 is coupled to one or both of the base 12 and the seat 14 and extends vertically upward from the seat 14 to support the back of the user. The backrest 16 includes a width W2, length L2, and thickness T2. The width W2 of the backrest 16 is parallel to the width W1 of the seat 14 and is similar in size, at least at areas adjacent to the seat 14. As shown, the width W2 of the backrest 16 may narrow at a height above the seat 14. The length L2 of the backrest 16 is transverse to the length L1 of the seat 14, as the backrest extends generally vertically along its length L2 from the seat 14 to a height above the seat 14 to support the users back when the user is sitting upon the seat 12. In some embodiments, the length L2 of the backrest 16 is approximately perpendicular to the length L1 of the seat 14, though this may vary based on a desired (and sometimes adjustable) backrest incline angle. The thickness T2 of the backrest 16 extends between a rear surface 36 and a front supporting surface 38 upon which a user can rest his back.

In addition to the description above relating to the thicknesses T1, T2, the thicknesses T1, T2 of the seat 14 and backrest 16, respectively, are also defined as the direction upon which the weight of the user acts when sitting on the seat 14 and reclining against the backrest 16. The widths W1, W2 and lengths L1, L2 are transverse to the respective thicknesses T1, T2.

A cushion length adjust (CLA) 42, also referred to as a cushion extend or extension, supports the rear of the user's legs when the user is seated upon the seating arrangement 10 and is coupled to the seat 14 at the front side 24 of the seat 14. The CLA 42 extends outward from the front side 24 of the seat 14 in the lengthwise direction of the seat 14. As shown in FIG. 1, the CLA 42 is a full width CLA such that it extends substantially the full width W1 of the seat 14 (e.g., at least 80% of the width W1 of the seat 14, at least 90% of the width W1 of the seat 14, at least 100% of the width W1 of the seat 14). By extending the full width W1 of the seat 14, the CLA 42 supports the legs of the user at a greater range of positions and spreads out a reaction force (supporting the legs of the user) across a greater surface area. Additionally, in some instances, the user may turn sideways (i.e., sidesaddle) in the seating apparatus 10, for example, to look out of a side or rear window of the vehicle 100. The full width CLA 42 provides support for the legs of the user when the user is sitting side saddle and can prevent pinching of the legs of the user at the smooth interface between the seat 14 and the CLA 42.

The CLA 42 is adjustable between a plurality of positions via an adjustment mechanism (not shown) to modify the overall length of the seating surface 28 to provide leg support for users of different heights. The adjustment mechanism may include, for example, a linkage assembly, a gear assembly (e.g., rack and pinion gears), and/or a motorized assembly.

FIGS. 2 and 3 illustrate a full width CLA 42. The CLA 42 includes a central portion 44, a first wing 46 coupled to a first side of the central portion 44, and a second wing 48 coupled to a second (opposite) side of the central portion 44. The wings 46, 48 and the central portion 44 sandwiched between the wings 46, 48 collectively define the width W3 (FIG. 3) of the CLA 42. The central portion 44 is stepped and includes two horizontal portions connected via a vertical portion. A compressible material such as foam is placed over the central portion 44 to provide support and comfort for the legs of the user.

The wings 46, 48 are coupled (e.g., integrally formed, welded, etc.) to the central portion 44. In some embodiments, the wings 46, 48 are identical and mirrored relative to one another such that the CLA 42 is symmetrical. In other embodiments, the wings 46, 48 are asymmetrical. Each wing 46, 48 is defined by three arcuate profiles 52, 54, 56. A first arcuate profile 52 extends in a generally widthwise direction adjacent the front side 24 of the seat 14. A second arcuate profile 54 slopes downward along the outer extents of the central portion 44. A third arcuate profile 56 connects the first and second arcuate profiles 52, 54. Collectively, the profiles 52, 54, 56 of each wing 46, 48 form a surface 58 that curves downward in a single direction, from the front side 24 of the seat 14 forward and away from the seat 14. A thinner compressible material (e.g., foam; not shown) is positioned over each of the wings 46, 48 for comfort, though the thickness and amount of foam is limited based on the overall allowable size of the chair and restrictions stemming from the location of the vehicle controls and cabin size.

FIG. 4 illustrates a CLA 42' similar to the CLA 42 shown in FIGS. 2-3. The CLA 42' differs from the CLA 42 as described below. Similar elements are described with similar reference numerals, annotated with an apostrophe.

The wings 46',48' of the CLA 42' form an upper surface 58' that curves downward in two directions, from the front side 24' of the seat 14' forward and away from the seat 14' and also outward in the widthwise direction away from the central portion 44'. By rolling the edge in the outside widthwise direction, the legs of the user are not pressed against a sharp edge, even when sitting sidesaddle in the seating arrangement 10', as discussed above.

Various features of the disclosure are set forth in the following clause.

Clause 1: A seating arrangement comprises a base and a seat mounted to the base, the seat having a width extending from a first side to a second side and a length extending from a front side to a rear side, the seat configured to support a user seated thereupon. The seating arrangement further includes a backrest extending transverse to the seat adjacent the rear side of the seat, the backrest configured to support a back of the user. The seating arrangement further includes a cushion length adjust (CLA) coupled to the seat at the front side, the CLA having a width bisected by a centerline, such that a first side of the CLA is adjacent the first side of the seat and a second side of the CLA is adjacent the second side of the seat. The first side of the CLA is a curved surface extending downward toward the base away from the centerline and from back to front, and the second side of the CLA is a curved surface extending downward toward the base away from the centerline and from back to front.

What is claimed is:

1. A seating arrangement comprising:
    a base;
    a seat mounted to the base, the seat having a width extending from a first side to a second side and a length extending in a forward direction from a rear side to a front side, the seat configured to support a user seated thereupon;
    a backrest positioned adjacent the rear side of the seat and configured to support a back of the user; and
    a cushion length adjustment (CLA) coupled to the seat at the front side, the CLA having a width bisected by a centerline, such that a first side of the CLA is adjacent the first side of the seat and a second side of the CLA is adjacent the second side of the seat, the first side of the CLA at least partially defined by a first curved surface extending downward in the forward direction and extending downward toward the base away from the centerline, the second side of the CLA at least partially defined by a second curved surface extending downward in the forward direction and extending downward toward the base away from the centerline;
    wherein the first curved surface is defined by a first arcuate profile extending in a widthwise direction perpendicular to the forward direction adjacent the front side of the seat, a second arcuate profile sloping downward in the forward direction, and a third arcuate profile that connects the first and second arcuate profiles.

2. The seating arrangement of claim 1, wherein the cushion length adjustment is mirrored about the centerline.

3. The seating arrangement of claim 1, wherein the CLA extends forward of the front side of the seat in the forward direction.

4. The seating arrangement of claim 1, wherein the CLA has a width parallel to the width of the seat, wherein the width of the CLA extends at least 80% of the width of the seat.

5. The seating arrangement of claim 1, wherein the CLA has a width parallel to the width of the seat, wherein the width of the CLA extends at least 90% of the width of the seat.

6. The seating arrangement of claim 1, wherein the CLA has a width parallel to the width of the seat, wherein the width of the CLA extends at least 100% of the width of the seat.

7. The seating arrangement of claim 1, wherein the first curved surface of the CLA is aligned with the first side of the seat to define a smooth interface between the first curved surface and the first side of the seat.

8. The seating arrangement of claim 7, wherein the second curved surface of the CLA is aligned with the second side of the seat to define a smooth interface between the second curved surface and the second side of the seat.

9. The seating arrangement of claim 1, wherein the CLA includes a central portion, a first wing coupled to a first side of the central portion, and a second wing coupled to a second side of the central portion, wherein the first wing defines the first curved surface and the second wing defines the second curved surface.

10. The seating arrangement of claim 9, wherein the central portion, the first wing, and the second wing collectively define a width of the CLA.

11. The seating arrangement of claim 9, wherein the central portion includes two horizontal portions connected by a vertical portion, and wherein the CLA further comprises a compressible material located adjacent the vertical portion.

12. The seating arrangement of claim 9, wherein the CLA further comprises a compressible material positioned over each of the first wing and the second wing.

13. The seating arrangement of claim 1, wherein the CLA further comprises a compressible material positioned over the first curved surface and the second curved surface.

14. The seating arrangement of claim 1, wherein the CLA is located directly adjacent to the front side of the seat.

15. The seating arrangement of claim 1, wherein the second curved surface mirrors the first curved surface.

16. The seating arrangement of claim 1, wherein the position of the CLA is adjustable relative to the seat.

17. The seating arrangement of claim 1, wherein the position of the CLA is adjustable relative to the base.

18. The seating arrangement of claim 1, wherein the seat is an automotive seat positionable in a vehicle for use by an operator of the vehicle.

19. A seating arrangement comprising:
    a base;
    a seat mounted to the base, the seat having a width extending from a first side to a second side and a length extending in a forward direction from a rear side to a front side, the seat configured to support a user seated thereupon;
    a backrest positioned adjacent the rear side of the seat and configured to support a back of the user; and
    a cushion length adjustment (CLA) coupled to the seat at the front side, the CLA having a width bisected by a centerline, such that a first side of the CLA is adjacent the first side of the seat and a second side of the CLA is adjacent the second side of the seat, wherein the first side of the CLA is aligned with the first side of the seat to define a smooth interface between the first side of the CLA and the first side of the seat, and wherein the second side of the CLA is aligned with the second side of the seat to define a smooth interface between the second side of the CLA and the second side of the seat;

wherein the first side of the CLA is at least partially defined by a first curved surface, and wherein the first curved surface is defined by a first arcuate profile extending in a widthwise direction perpendicular to the forward direction adjacent the front side of the seat, a second arcuate profile sloping downward in the forward direction, and a third arcuate profile that connects the first and second arcuate profiles.

20. A seating arrangement comprising:

a base;

a seat mounted to the base, the seat having a width extending from a first side to a second side and a length extending in a forward direction from a rear side to a front side, the seat configured to support a user seated thereupon;

a backrest positioned adjacent the rear side of the seat and configured to support a back of the user; and a cushion length adjustment (CLA) coupled to the seat at the front side, the CLA having a width bisected by a centerline, such that a first side of the CLA is adjacent the first side of the seat and a second side of the CLA is adjacent the second side of the seat, the first side of the CLA at least partially defined by a first curved surface extending downward in the forward direction and extending downward toward the base away from the centerline, the second side of the CLA at least partially defined by a second curved surface extending downward in the forward direction and extending downward toward the base away from the centerline;

wherein the CLA includes a central portion, a first wing coupled to a first side of the central portion, and a second wing coupled to a second side of the central portion, wherein the first wing defines the first curved surface and the second wing defines the second curved surface; and wherein the central portion includes two horizontal portions connected by a vertical portion, and wherein the CLA further comprises a compressible material located adjacent the vertical portion.

* * * * *